(12) United States Patent  
Botarelli

(10) Patent No.: US 9,140,195 B2  
(45) Date of Patent: Sep. 22, 2015

(54) EXHAUST TEMPERATURE VERSUS TURBINE PRESSURE RATIO BASED TURBINE CONTROL METHOD AND DEVICE

(75) Inventor: Claudio Botarelli, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 32 days.

(21) Appl. No.: 13/512,108

(22) PCT Filed: Nov. 19, 2010

(86) PCT No.: PCT/EP2010/067792  
§ 371 (c)(1),  
(2), (4) Date: May 25, 2012

(87) PCT Pub. No.: WO2011/064143  
PCT Pub. Date: Jun. 3, 2011

(65) Prior Publication Data  
US 2013/0019607 A1    Jan. 24, 2013

(30) Foreign Application Priority Data  
Nov. 27, 2009 (IT) .............................. CO2009A0052

(51) Int. Cl.  
*F02C 9/20* (2006.01)  
*F02C 9/00* (2006.01)

(52) U.S. Cl.  
CPC ... *F02C 9/20* (2013.01); *F02C 9/00* (2013.01); *F05D 2270/301* (2013.01); *F05D 2270/303* (2013.01); *F23N 2023/42* (2013.01);  
(Continued)

(58) Field of Classification Search  
CPC ................ F02C 9/20; F02C 9/22; F02C 9/26; F02C 9/28; F02C 9/40  
USPC ........................ 60/39.23, 39.24, 39.27, 793  
See application file for complete search history.

(56) References Cited

U.S. PATENT DOCUMENTS 2,981,058 A * 4/1961 Reed ............................... 137/84  
6,336,060 B1 * 1/2002 Shigemi et al. ................... 701/7  
(Continued)

FOREIGN PATENT DOCUMENTS

CN          1703574 A    11/2005  
DE   102007008296 A1 *   8/2008  
(Continued)

OTHER PUBLICATIONS

Cory, William. Fans and Ventilation—A Practical Guide. (2005). Elsevier. ISBN: 978-0-08-044626-4.*  
(Continued)

*Primary Examiner* — Phutthiwat Wongwian  
*Assistant Examiner* — Jason H Duger  
(74) *Attorney, Agent, or Firm* — GE Global Patent Operation

(57) ABSTRACT

Gas turbine, software and method for controlling an operating point of the gas turbine that includes a compressor, a combustor and at least a turbine is provided. The method includes determining a turbine exhaust pressure at an exhaust of the turbine; measuring a compressor pressure discharge at the compressor; determining a turbine pressure ratio based on the turbine exhaust pressure and the compressor pressure discharge; calculating an exhaust temperature at the exhaust of the turbine as a function of the turbine pressure ratio; identifying a reference exhaust temperature curve in a plane defined by the exhaust temperature and the turbine pressure ratio; and controlling the gas turbine to maintain the operating point on the reference exhaust temperature curve.

10 Claims, 8 Drawing Sheets

(52) U.S. Cl.
CPC ......... *F23N2023/44* (2013.01); *F23N 2025/04* (2013.01); *F23N 2025/10* (2013.01); *F23N 2025/26* (2013.01); *F23N 2041/20* (2013.01); *Y02T 50/677* (2013.01)

(56) References Cited

U.S. PATENT DOCUMENTS

| | | |
|---|---|---|
| 6,442,941 B1 | 9/2002 | Anand et al. |
| 6,687,596 B2 | 2/2004 | Humerickhouse et al. |
| 6,715,916 B2 | 4/2004 | Tomlinson et al. |
| 6,805,483 B2 * | 10/2004 | Tomlinson et al. ............ 374/144 |
| 6,945,030 B2 | 9/2005 | Hirayama et al. |
| 7,191,588 B2 | 3/2007 | Tanaka et al. |
| 7,246,002 B2 | 7/2007 | Healy et al. |
| 7,610,745 B2 | 11/2009 | Fujii et al. |
| 7,756,626 B2 | 7/2010 | Fujii et al. |
| 2002/0106001 A1 | 8/2002 | Tomlinson |
| 2004/0076218 A1 | 4/2004 | Tomlinson |
| 2004/0107702 A1 | 6/2004 | Nichols et al. |
| 2006/0242963 A1 | 11/2006 | Casoni |
| 2007/0079593 A1 | 4/2007 | Fujii |
| 2007/0125090 A1 | 6/2007 | Martis et al. |
| 2007/0245745 A1 | 10/2007 | Davies |
| 2007/0271024 A1 * | 11/2007 | Fujii et al. ..................... 701/100 |
| 2008/0243352 A1 | 10/2008 | Healy |
| 2009/0193788 A1 * | 8/2009 | Szepek et al. .............. 60/39.281 |
| 2010/0050591 A1 * | 3/2010 | Nemet et al. ................. 60/39.24 |

FOREIGN PATENT DOCUMENTS

| | | |
|---|---|---|
| EP | 1231369 A2 | 8/2002 |
| EP | 1533573 A1 | 5/2005 |
| EP | 1860302 A1 | 11/2007 |
| EP | 2085577 A1 | 8/2009 |
| EP | 2107305 A1 | 10/2009 |
| JP | 2000205563 A | 7/2000 |
| JP | 2002097970 A | 4/2002 |
| JP | 2002130852 A | 5/2002 |
| JP | 2002181399 A | 6/2002 |
| JP | 2002357320 A | 12/2002 |
| JP | 2003176726 A | 6/2003 |
| JP | 2004027848 A | 1/2004 |
| JP | 2005155622 A | 6/2005 |
| JP | 2007077867 A | 3/2007 |
| JP | 2007309279 A | 11/2007 |

OTHER PUBLICATIONS

Lecture: Air Movement and Natural Ventilation (2001), Hong Kong University, http://www.arch.hku.hk/teaching/lectures/airvent/sect02.htm.*

Search Report and Written Opinion for corresponding International Patent Application No. PCT/EP2010/067792, dated Aug. 22, 2011.

Search Report and Written Opinion for corresponding Italian Patent Application No. IT CO2009A000052, dated Jul. 26, 2010.

Basu, Arun et al. "Use of DME as a Gas Turbine Fuel", ASME Turbo-Expo, New Orleans, Jun. 2001, pp. 1-6.

Unofficial English translation of Office Action issued in connection with corresponding JP Application No. 2012-540369 on Aug. 5, 2014.

Unofficial English translation of CN Office Action issued Mar. 31, 2014 in connection with corresponding CN Patent Application No. 201080062596.8.

* cited by examiner

EXHAUST TEMPERATURE VERSUS TURBINE PRESSURE RATIO BASED TURBINE CONTROL METHOD AND DEVICE

CROSS REFERENCE TO RELATED APPLICATIONS

This is a national stage application under 35 U.S.C. §371(c) of prior-filed, co-pending PCT patent application serial number PCT/EP2010/067792, filed on Nov. 19, 2010, which claims priority to Italian Patent Application Serial No. CO2009A000052, filed on Nov. 27, 2009, the entire contents of which are incorporated herein by reference.

BACKGROUND OF THE INVENTION

1. Field of the Invention

Embodiments of the subject matter disclosed herein generally relate to methods and systems and, more particularly, to mechanisms and techniques for controlling a turbine.

2. Description of the Related Art

Turbomachinery used, for example, in power plants or jet engines, are continuously evolving based on new discoveries and better materials. In addition, the manufacturers of these machines are under increased pressure to produce or improve the machines to be "greener," i.e., to reduce the amount of pollution produced while operating.

Thus, there is ongoing research for lowering the exhaust emissions of turbo machineries especially considering the desire to use a wide range of gaseous fuels. Meeting these requirements becomes more and more difficult, particularly when considering the wide range of operation of these devices. An accurate turbomachine exhaust temperature control becomes, under these conditions, a relevant factor in order to develop successful applications.

One approach for lowering the pollution produced by a turbomachine is based on a paradigm of exhaust temperature versus compressor pressure ratio. In this regard, U.S. Patent Application Publication 2008/0243352, the entire content of which is included here by reference, describes that current control systems may execute scheduling algorithms that adjust the fuel flow, inlet guide vanes (IGV), and other control inputs to provide safe and efficient operation of a gas turbine. Gas turbine control systems may receive as inputs operating parameters and settings that, in conjunction with scheduling algorithms, determine turbine control settings to achieve the desired operation. Measured operating parameters may include compressor inlet pressure and temperature, compressor exit pressure and temperature, turbine exhaust temperature, and generator power output. Desired operating settings may include generator power output and exhaust energy. The schedules (e.g., exhaust temperature vs. compressor pressure ratio, fuel splits vs. combustion reference temperature, inlet bleed heat (IBH) vs. IGV, compressor operating limit line vs. corrected speed and inlet guide vane, etc.) are defined to protect the turbine against known operational boundaries (e.g., emissions, dynamics, lean-blow-out, compressor surge, compressor icing, compressor clearances, aero-mechanical, etc.) based on off-line field tests or laboratory data. The output of the schedules then determines the appropriate adjustment of the control system inputs. Typical control inputs managed by a control system may include fuel flow, combustor fuel distribution (which may be referred to as "fuel splits"), compressor inlet guide vane position, and inlet bleed heat flow.

FIG. 1, which is similar to FIG. 1 of U.S. Patent Application Publication 2008/0243352, illustrates an example of a gas turbine 10 having a compressor 12, a combustor 14, a turbine 16 coupled to the compressor 12, and a computer control system (controller) 18. An inlet duct 20 to the compressor 12 may feed ambient air to compressor 12. The inlet duct 20 may have ducts, filters, screens and noise abatement devices that contribute to a pressure loss of ambient air flowing through the inlet 20 and into inlet guide vanes 21 of the compressor 12. An exhaust duct 22 for the turbine directs combustion gases from the outlet of the turbine 10 through, for example, emission control and noise abatement devices. The amount of inlet pressure loss and back pressure may vary over time due to the addition of components and due to dust and dirt clogging the inlet 20 and exhaust ducts 22. The turbine 10 may drive a generator 24 that produces electrical power.

As described in U.S. Patent Application Publication 2008/0243352, the operation of the gas turbine 10 may be monitored by several sensors 26 designed to measure different performance-related variables of the turbine 10, the generator and the ambient environment. For example, groups of redundant temperature sensors 26 may monitor ambient temperature surrounding the gas turbine 10, compressor discharge temperature, turbine exhaust gas temperature, and other temperature measurements of the gas stream through the gas turbine 10. Similarly, groups of redundant pressure sensors 26 may monitor ambient pressure, and static and dynamic pressure levels at the compressor inlet and outlet turbine exhaust, at other locations in the gas stream through the gas turbine 10. Groups of redundant humidity sensors 26, for example, wet and dry bulb thermometers, may measure ambient humidity in the inlet duct of the compressor 12. Groups of redundant sensors 26 may also include flow sensors, speed sensors, flame detector sensors, valve position sensors, guide vane angle sensors, or the like, that sense various parameters pertinent to the operation of gas turbine 10. As used herein, "parameters" refer to items that can be used to define the operating conditions of the turbine, such as but not limited to temperatures, pressures, and gas flows at defined locations in the turbine.

Also described in U.S. Patent Application Publication 2008/0243352A, the fuel control system 28 regulates the fuel flowing from a fuel supply to the combustor 14, one or more splits between the fuel flowing into primary and secondary fuel nozzles, and the amount of fuel mixed with secondary air flowing into a combustion chamber. The fuel control system 28 may also select the type of fuel for the combustor. The fuel control system 28 may be a separate unit or may be a component of the main controller 18. The controller 18 may be a computer system having at least one processor that executes programs and operations to control the operation of the gas turbine using sensor inputs and instructions from human operators. The programs and operations executed by the controller 18 may include, among others, sensing or modeling operating parameters, modeling operational boundaries, applying operational boundary models, applying scheduling algorithms, and applying boundary control logic to close loop on boundaries. The commands generated by the controller 18 may cause actuators on the gas turbine to, for example, adjust valves (actuator 27) between the fuel supply and combustors that regulate the flow, fuel splits and type of fuel flowing to the combustors; adjust inlet guide vanes 21 (actuator 29) on the compressor; adjust inlet bleed heat; as well as activate other control settings on the gas turbine.

U.S. Patent Application Nos. 2002/0106001 and 2004/0076218, the entire contents of which are incorporated here by reference, describe a method and system for adjusting turbine control algorithms to provide accurate calculation of a firing temperature and combustion reference temperature of a gas turbine as the water vapor content in a working fluid varies substantially from a design value. These references disclose using turbine temperature exhaust and turbine pressure ratio for controlling the firing temperature.

However, the traditional methods and systems are limited in their capability of controlling the gas turbine and accordingly, it would be desirable to provide systems and methods that obtain a more accurate firing temperature control, and/or a more accurate combustion parameters control, and/or a more accurate exhaust emissions control.

BRIEF SUMMARY OF THE INVENTION

According to an exemplary embodiment, there is a method for controlling an operating point of a gas turbine that includes a compressor, a combustor and at least a turbine. The method includes determining a turbine exhaust pressure at an exhaust of the turbine; measuring a compressor pressure discharge at the compressor; determining a turbine pressure ratio based on the turbine exhaust pressure and the compressor pressure discharge; calculating an exhaust temperature at the exhaust of the turbine as a function of the turbine pressure ratio; identifying a reference exhaust temperature curve in a plane defined by the exhaust temperature and the turbine pressure ratio, wherein the reference exhaust temperature curve includes those points that are optimal for operating the gas turbine; and controlling the gas turbine to maintain the operating point on the reference exhaust temperature curve.

According to another exemplary embodiment, there is a gas turbine having a control device for controlling an operating point of the gas turbine provided. The gas turbine includes a compressor configured to compress a fluid, a combustor connected to a discharge of the compressor and configured to mix the compressed fluid with fuel, at least a turbine connected to the compressor and configured to expand burnt gas from the combustor to generate power to an output of the gas turbine, a pressure sensor provided at the discharge of the compressor to measure a compressor pressure discharge, and a processor that communicates with the pressure sensor. The processor is configured to determine a turbine exhaust pressure at an exhaust of the turbine, determine a turbine pressure ratio based on the turbine exhaust pressure and the compressor pressure discharge, calculate an exhaust temperature at the exhaust of the turbine as a function of the turbine pressure ratio, identify a reference exhaust temperature curve in a plane defined by the exhaust temperature and the turbine pressure ratio. The reference exhaust temperature curve includes those points that are optimal for operating the gas turbine, and control the gas turbine to maintain the operating point on the reference exhaust temperature curve.

According to still another exemplary embodiment, there is a computer readable medium including computer executable instructions, wherein the instructions, when executed, implement a method for controlling an operating point of a gas turbine that includes a compressor, a combustor and at least a turbine. The method includes determining a turbine exhaust pressure at an exhaust of the turbine; measuring a compressor pressure discharge at the compressor; determining a turbine pressure ratio based on the turbine exhaust pressure and the compressor pressure discharge; calculating an exhaust temperature at the exhaust of the turbine as a function of the turbine pressure ratio; identifying a reference exhaust temperature curve in a plane defined by the exhaust temperature and the turbine pressure ratio, where the reference exhaust temperature curve includes those points that are optimal for operating the gas turbine; and controlling the gas turbine to maintain the operating point on the reference exhaust temperature curve.

BRIEF DESCRIPTION OF THE DRAWINGS

The accompanying drawings, which are incorporated in and constitute a part of the specification, illustrate embodiments of the present invention and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a single shaft gas turbine system. However, the embodiments to be discussed next are not limited to these systems, but may be applied to other systems, for example multiple shaft gas turbines.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Furthermore, the particular features, structures or characteristics may be combined in any suitable manner in one or more embodiments.

Figure 1:
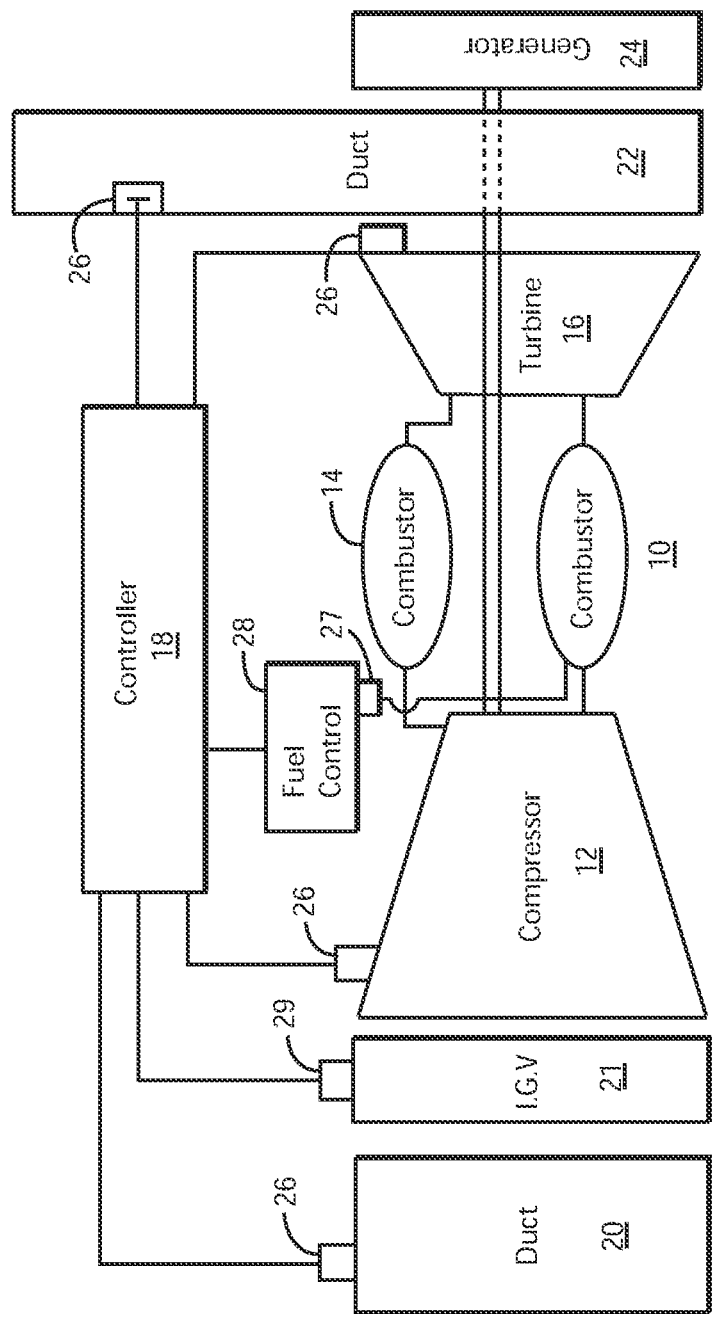
FIG. 1 is a schematic diagram of a conventional gas turbine.

As discussed above with regard to FIG. 1, various parameters of the turbine 10 may be measured and/or calculated for determining a desired quantity to be monitored. Such a quantity is the firing temperature of the turbine. By maintaining the firing temperature of the turbine within an optimum range, the operation of the turbine is considered to be smooth and under control. When the firing temperature of the turbine exits the optimum range, the controller 18 is configured to change, for example, the compressor's air flow rate and thus, a compressor pressure ratio, for adjusting the firing temperature. Events that may determine the firing temperature to exit the optimum range is, for example, a change in a load of the gas turbine or a gas fuel composition change.

However, the novel embodiments to be discussed next do not rely on the traditional paradigms for controlling the gas turbine but rather rely on a novel paradigm, e.g., controlling a turbine temperature exhaust based on a turbine pressure ratio. This novel paradigm offers a more accurate estimation of the state of the gas turbine and is also more sensitive to changes occurring in the functioning of the gas turbine, e.g., load change.

Figure 2:
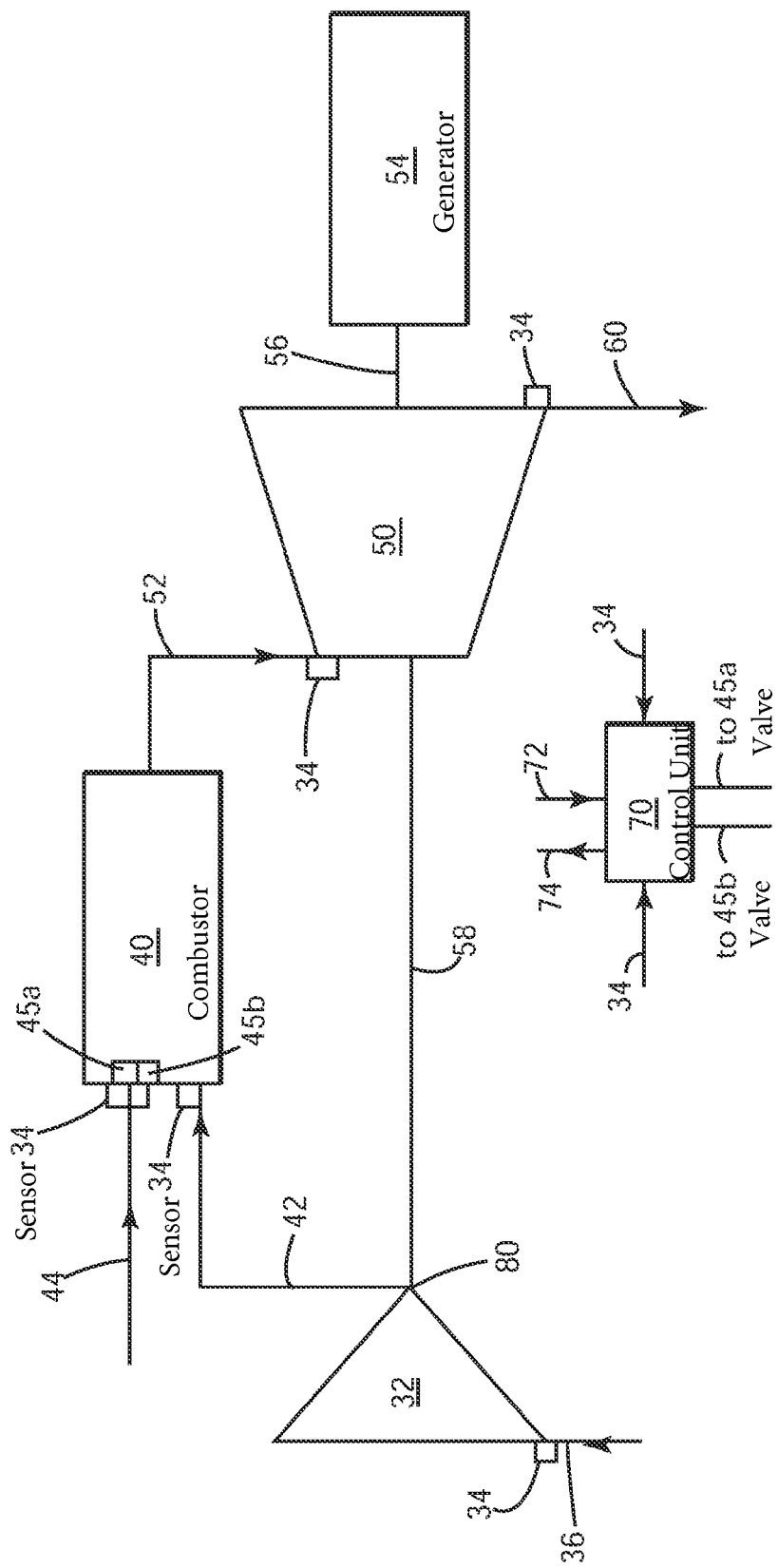
FIG. 2 is a schematic diagram of a gas turbine considered in an embodiment of the subject matter disclosed.

According to an exemplary embodiment, an exhaust temperature is determined as a function of the turbine pressure ratio and the exhaust temperature is monitored and maintained within certain boundaries for ensuring an efficient operation of the gas turbine, e.g., accommodating base load, low load, high load, etc. More details about determining the exhaust temperature and the turbine pressure ratio are discussed next with regard to FIG. 2. FIG. 2 shows a gas turbine 30 having a compressor 32 configured to receive a fluid (e.g., air) through an inlet duct 36. Sensors 34 may be disposed at inlet duct 36 for measuring at least one of a pressure, temperature, humidity, etc.

The fluid is compressed by the compressor 32 and the compressed fluid is sent to a combustor 40 via a path 42 to be mixed with fuel (e.g., natural gas) supplied by a feeding duct 44. More sensors 34 may be disposed in or around combustor 40 for measuring characteristics of the compressed fluid and/or the fuel. Combustion in combustor 40 takes place and this combustion raises the temperature of the mixture of compressed fluid and fuel to a firing temperature. Fuel is provided via feeding duct 44 to primary and secondary burners, as disclosed later. Valves 45a and 45b are used to provide fuel to the primary and secondary burners. A control unit 70 is also configured to adjust valves 45a and 45b to provide a desired percentage of the fuel to the primary and secondary valves. The flow of combusted gas, having a high energy, is supplied via ducts 52 to a turbine 50, which may be mechanically connected with a shaft 56 to a generator 54. The generator 54 may produce electric power. Turbine 50 is also mechanically connected via a shaft 58 to the compressor 30, thus supplying the required driving power to the compressor 30. Discharge gases are expelled from the turbine 50 through an outlet duct 60. Both the inlet duct 52 and the outlet duct 60 may be monitored by sensors 34.

Data from sensors 34 is provided to the control unit 70. The control unit 70 may receive additional data via an input port 72. Based on processes computed by the control unit 70, various commands are provided via an output port 74 to different parts of the gas turbine 30, e.g., commands to rotate the vanes, to modify a rotational speed of the shaft, etc. A detailed structure of the control unit 70 is discussed later.

According to an exemplary embodiment, the proposed new control of the gas turbine is based on a turbine temperature exhaust (ttx), which is measured/determined at outlet 60, versus the turbine pressure ratio (tpr), which is measured/determined as a ratio between a discharge pressure of the compressor 32 and an exhaust pressure of the turbine 50. With reference to FIG. 2, the discharge pressure of the compressor 32 is measured at point 80 and the exhaust pressure of the turbine 50 is measured at point 60. However, according to an exemplary embodiment, the exhaust pressure may be measured/estimated inside combustor 40, at an inlet of turbine 50 or inside turbine 50. These pressures are discussed later in more details. It is noted that the particulars discussed next for determining ttx are for illustrative purposes and not to limit the subject matter disclosed.

Figure 3:
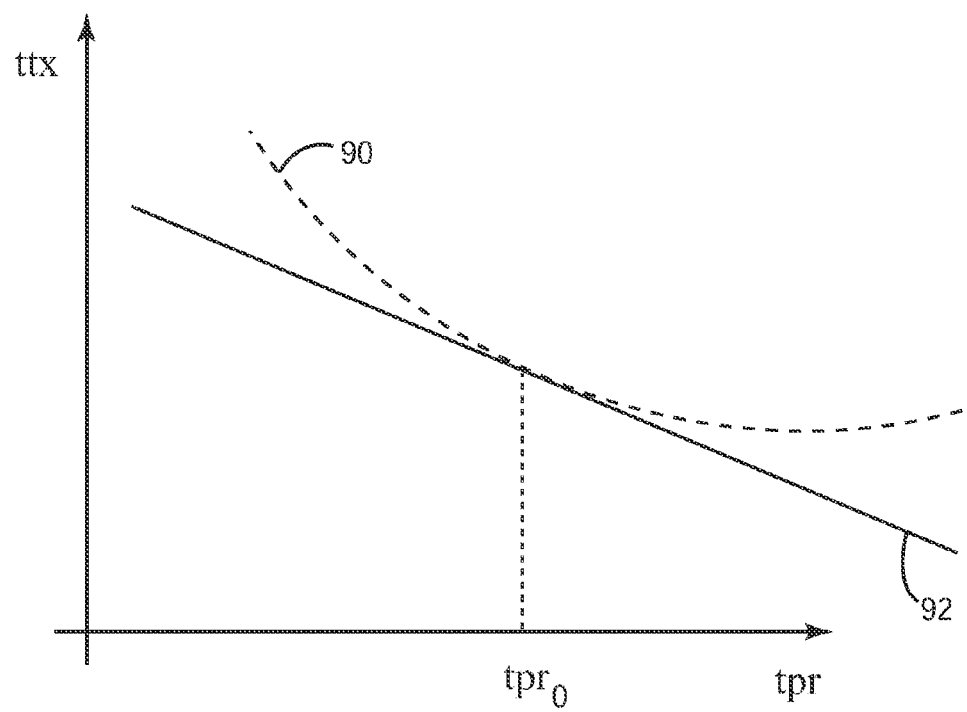
FIG. 3 is a graph illustrating the variation of an exhaust temperature versus a pressure ratio of the turbine according to an exemplary embodiment.
Figure 4:
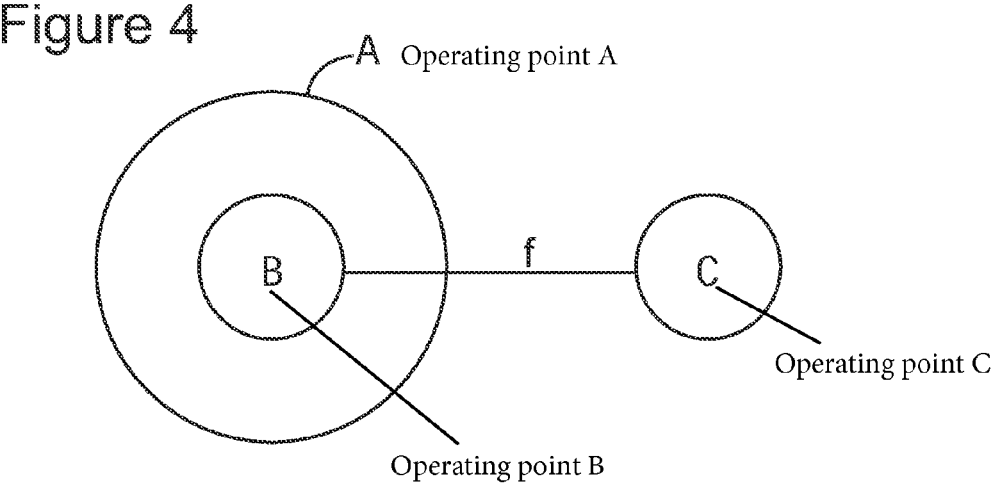
FIG. 4 is a schematic illustration of a relationship between operating points and optimal operating points of the gas turbine according to an exemplary embodiment.

FIG. 3 shows a (ttx, tpr) plane. Each point in this plane may be considered as belonging to a set A as shown in FIG. 4. Set A is defined as including operating points for the gas turbine 30 based on a combustion model. Set A includes a subset B of points. These points are determined as discussed next and are defined as optimum operating points for the gas turbine 30.

Those points of the plane (ttx, tpr), i.e., points from set A, that correspond to constant firing temperature, constant speed, constant IGV angle, constant air's specific humidity and constant bleed conditions may be represented by a curve 90, which may have an upwards concavity. The turbine pressure ratio tpr may vary with the compressor inlet temperature. An error introduced when approximating curve 90, which may be a parabola with its osculatory straight line 92 at $tpr=tpr_0$ is small and may be neglected for values of tpr near to $tpr_0$. One skilled in the art would recognize that other approximating functions may be used.

Varying gradually the compressor inlet temperature, the compressor speed and the IGV angle, the curve 90 changes gradually, for example, without any discontinuity in its prime derivative. Therefore, the constant firing temperature locus, which may be calculated based on ttx, can be approximated by the linear interpolation of the osculatory straight line 92.

Based on the points in set B discussed above, a function f to be discussed later, is applied to determine points belonging to a set C. The points of set C are set points for the gas turbine operation as per control logic. In other words, points belonging to set C are calculated, as discussed next, and the operator of the gas turbine 30 controls some parameters for maintaining the gas turbine within set C. FIG. 4 illustrates this concept.

According to an exemplary embodiment, function f may be defined as f=g·h·l, where g, h, and l are mathematical functions or operators. For example, g may be a linear interpolation with an opportune fuel characteristic, h may be a bilinear interpolation of the angles of IGV and gas turbine speed, and l may be a polytropic correction given by $p \cdot T^{((1-\gamma)/\gamma)}$=constant. Setting the domain B, the codomain C is entirely defined through function f. Local perturbations in B produce local perturbations in C. Depending on the application, more or less functions or different functions may be used for defining function f. In other words, instead of the g, h, and l functions discussed above, other functions may be used or a different number of functions.

Figure 5:
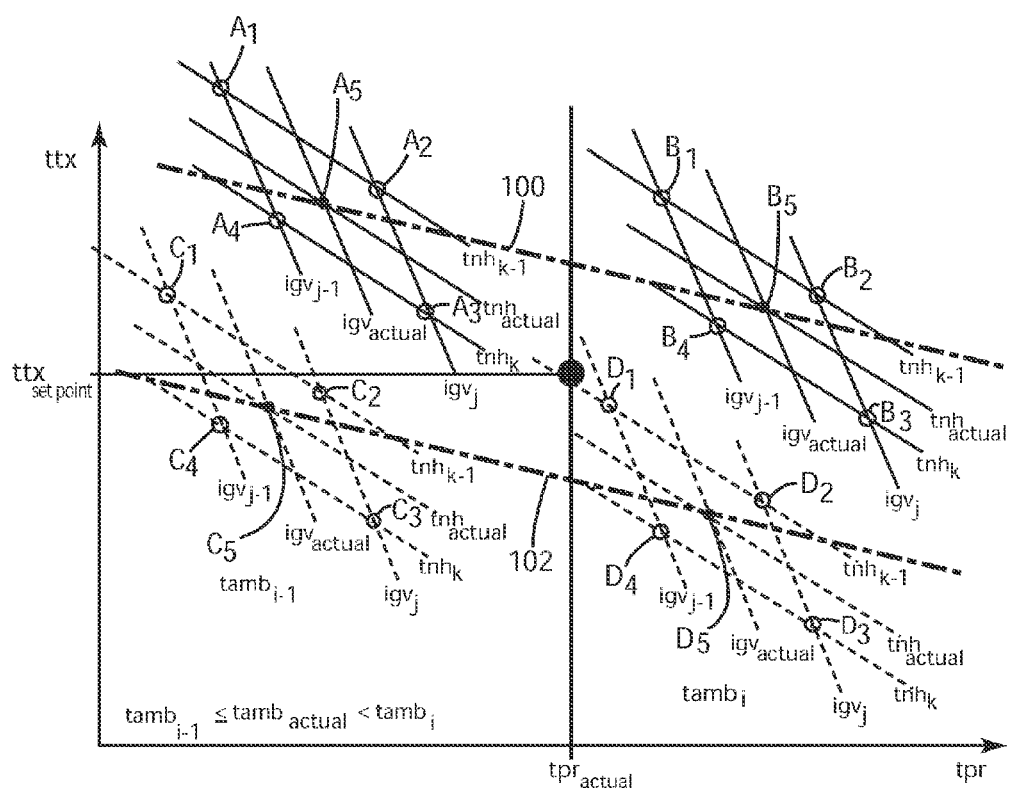
FIG. 5 is a schematic diagram of an exhaust temperature versus turbine pressure ratio plane according to an exemplary embodiment.

The determination of a set ttx temperatures, which is desired to be maintained for an efficient operation of the gas turbine 30 is now discussed. Assume that the gas turbine may operate in the following ranges: for an ambient temperature tamb, consider a range $tamb_{i-1} \leq tamb \leq tamb_i$, for an IGV angle igv, consider a range $igv_{j-1} \leq igv \leq igv_j$, and for a gas turbine speed tnh, consider a range $tnh_{k-1} \leq tnh \leq tnh_k$. Also suppose that the gas turbine is controlled at optimum firing temperature. Based on the above ranges, operational points of the gas turbine may be represented in the (ttx, tpr) space shown in FIG. 5 by curves defined by the following points. There are four points A1 to A4 for a lean fuel and for the lowest ambient temperature; there are four points B1 to B4 for the lean fuel and for the highest ambient temperature; there are four points C1 to C4 for a rich fuel and the lowest ambient temperature; and there are four points D1 to D4 for the rich fuel and the highest ambient temperature. The number of points may vary according to the nature of the interpolating function.

The lean fuel and the rich fuel are defined as follow. Gas turbines for industrial applications are using natural gas that includes $CH_4$ more than 90%. Natural gas is considered to be a rich gas fuel. Blending the natural gas with inert gases, for example, nitrogen, carbon dioxide, and argon, produces leaner gas fuels, i.e., lower LHV value (LHV is the lower heating value of the gas and describes the amount of energy that can be obtained from a unit of mass of the gas by burning the gas). The rich fuel may be obtained by blending the natural gas with heavier hydrocarbons, like ethane, propane, and/or butane.

For each of the above discussed set of points, a central point (A5, B5, C5 and D5) is calculated using two bilinear interpolations (function g discussed above). A bilinear interpolation is an extension of linear interpolation for interpolating functions of two variables on a regular grid. The bilinear interpolation performs linear interpolation first in one direction, and then again in the other direction. Points A5 and B5 define a temperature control curve 100 for the lean gas and points C5 and D5 define a temperature control curve 102 for the rich gas. As discussed above, another function, other than a bilinear interpolation may be used.

A $ttx_{set\ point}$ is determined by using a linear interpolation (function h discussed above or, in another application, other functions) of the two ordinates corresponding to the actual pressure ratios on the two control curves 100 and 102, based on the $LHV_{actual\ gas}$, the $LHV_{rich\ gas}$ and the $LHV_{lean\ gas}$.

Figure 6:
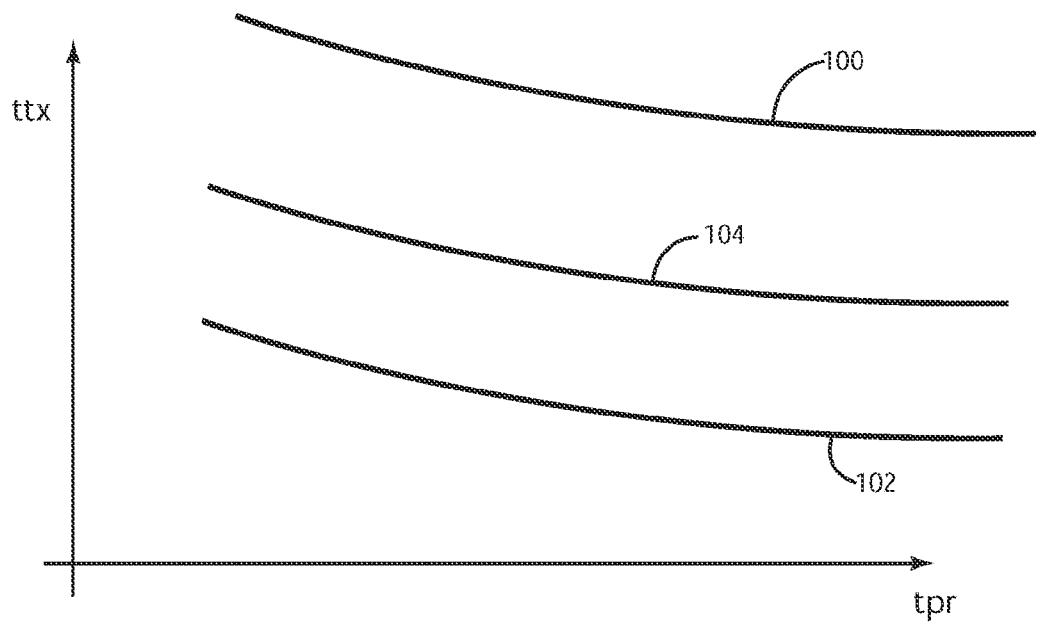
FIG. 6 is a schematic diagram of a reference exhaust temperature curve in the plane of FIG. 5 according to an exemplary embodiment.

If more points are calculated for other conditions and/or values of the considered parameters, more $ttx_{set\ point}$ may be determined. Plotting these points versus a corresponding tpr ratio results in a reference exhaust temperature curve 104, which is shown in FIG. 6. It is noted that the reference exhaust temperature curve 104 lies between the two control curves 100 and 102. According to an exemplary embodiment (not illustrated), curve 104 is parallel to curves 100 and 102.

Figure 7:
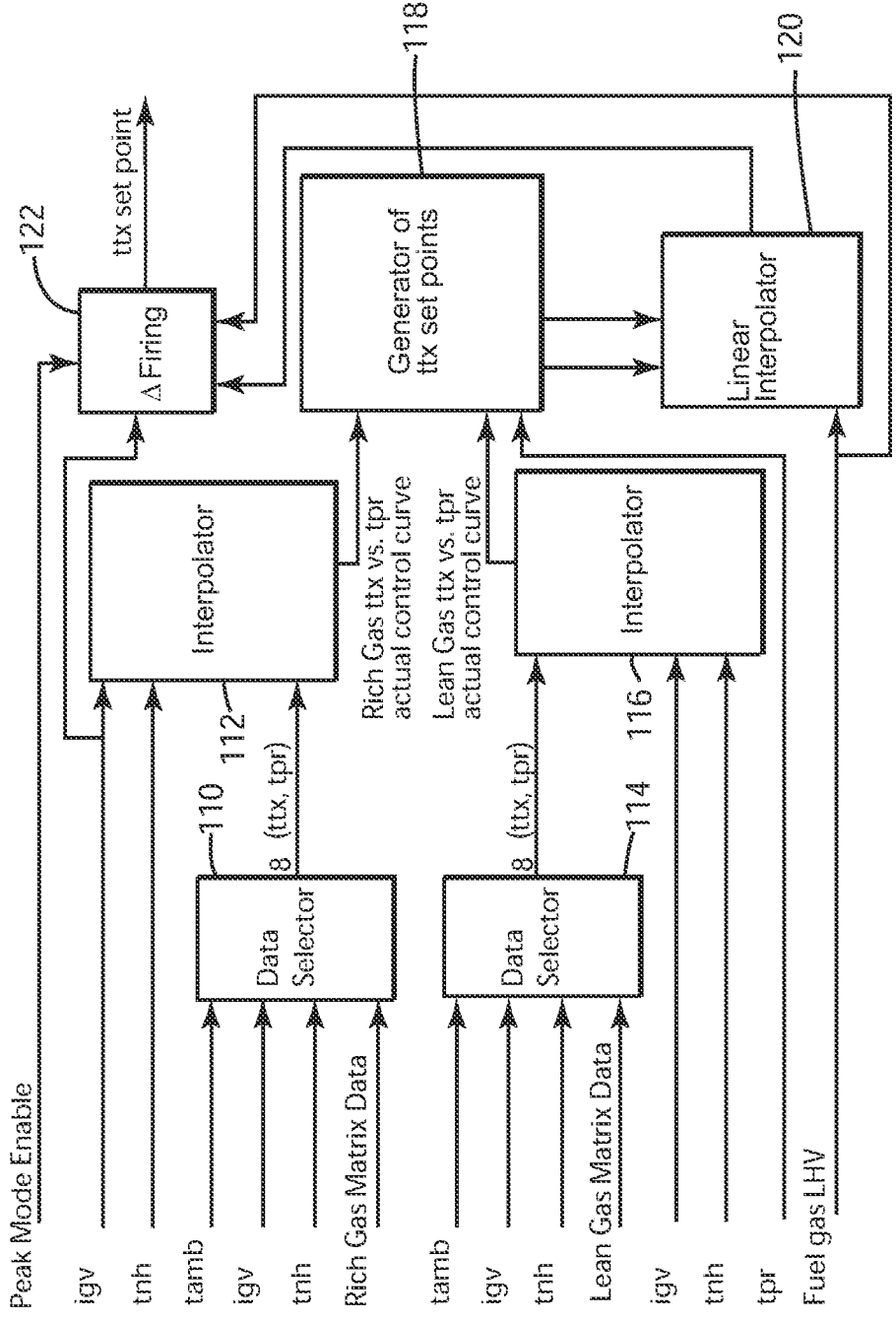
FIG. 7 is a flow chart illustrating steps for calculating an exhaust temperature set point for the turbine according to an exemplary embodiment.

The method for calculating the $ttx_{set\ point}$ may be represented in the block diagram shown in FIG. 7. According to this figure, data selector unit 110 receives as input the ambient temperature tamb, the rotation angle of the vanes IGV, the rotational speed tnh of the shaft and the rich gas matrix data. An example of the rich gas matrix data is:
ttxr

|  | $tamb_i$ | | | | |
| --- | --- | --- | --- | --- | --- |
| $ttxr_{i,j,k}$ | $igv_1$ | $igv_2$ | ... | $igv_5$ | $igv_6$ |
| $tnh_1$ | $ttxr_{i,1,1}$ | $ttxr_{i,2,1}$ | ... | $ttxr_{i,5,1}$ | $ttxr_{i,6,1}$ |
| $tnh_2$ | $ttxr_{i,1,2}$ | ... | ... | ... | ... |
| $tnh_3$ | $ttxr_{i,1,3}$ | ... | ... | ... | ... |
| $tnh_4$ | $ttxr_{i,1,4}$ | ... | ... | ... | $ttxr_{i,6,4}$ | and the turbine pressure ratio matrix for rich gas is given by:
tprr

|  | $tamb_i$ | | | | |
| --- | --- | --- | --- | --- | --- |
| $tprr_{i,j,k}$ | $igv_1$ | $igv_2$ | $igv_3$ | $igv_5$ | $igv_6$ |
| $tnh_1$ | $tprr_{i,1,1}$ | $tprr_{i,2,1}$ | $tprr_{i,3,1}$ | $tprr_{i,5,1}$ | $tprr_{i,6,1}$ |
| $tnh_2$ | $tprr_{i,1,2}$ | ... | ... | ... | ... |
| $tnh_3$ | $tprr_{i,1,3}$ | ... | ... | ... | ... |
| $tnh_4$ | $tprr_{i,1,4}$ | ... | ... | ... | $tprr_{i,6,4}$ |

Eight points C1 to C4 and D1 to D4 (shown in FIG. 5) are output by the data selector unit 110. This output is provided as input to interpolator unit 112. The same process is repeated by data selector unit 114 for the same parameters except that a lean gas matrix data is used instead of the rich gas matrix data. Output from interpolators 112 and 116, i.e., rich gas ttx versus tpr actual control curve and lean gas ttx versus tpr actual control gas, are provided as input to calculation unit 118 for calculating two ttx set points. Linear interpolator 120 receives the two ttx set points and interpolates them to produce a final point, the $ttx_{set\ point}$. Based on the output of the linear interpolator 120, a firing unit 122 may calculate variations of the $ttx_{set\ point}$ of the gas turbine. It is noted that the linear interpolator 120 and the firing unit 122 may receive directly information about the fuel gas LHV.

Having the $ttx_{set\ point}$, controller 70 may be programmed to monitor this value and to adjust various parameters of the gas turbine 30 (e.g., angle of IGV, fuel amount, etc.) to maintain the $ttx_{set\ point}$ in a predetermined range for an efficient operation of the gas turbine. In one exemplary embodiment in which a single shaft gas turbine is used, the $ttx_{set\ point}$ may be adjusted by controlling the IGV angle. The reference exhaust temperature curve ttxh 104, which the gas turbine is desired to follow, is now calculated.

Consider three vectors that identify the gas turbine operating parameters. These vectors are tamb, igv, and tnh, and they correspond to the ambient temperature, angle of IGV vanes, and shaft's rotational speed. The mathematical expressions for these three vectors are:
   $tamb=[tamb_i]=[tamb_1, tamb_2, \ldots, tamb_7]$
with index i being:
   2 if $tamb<tamb_2$
   3 if $tamb_2 \leq tamb<tamb_3$
   4 if $tamb_3 \leq tamb<tamb_4$
   5 if $tamb_4 \leq tamb<tamb_5$
   6 if $tamb_5 \leq tamb<tamb6$
   7 if $tamb_6 \leq tamb$,
where tamb is the actual ambient temperature.
The igv angle vector is defined as:
   $igv=[igv_j]=[igv_1, igv_2, \ldots, igv_6]$ with index j being:
   2 if $igv<igv_2$
   3 if $igv_2 \leq igv<igv_3$
   4 if $igv_3 \leq igv<igv_4$
   5 if $igv_4 \leq igv<igv_5$
   6 if $igv_5 \leq igv$,
where igv is the actual igv angle.
The tnh shaft speed vector is defined as:
   $tnh=[tnh_k]=[tnh_1, tnh_2, tnh_3, tnh_4]$ with index k being:
   2 if $tnh<tnh_2$
   3 if $tnh_2 \leq tnh<tnh_3$
   4 if $tnh_3 \leq tnh$,
where tnh is the actual shaft speed percentage. The values for i, j, and k differ from application to application and may include a large number of possibilities.

Four 3D matrices are introduced for calculating the reference exhaust temperature curve ttxh, i.e., a reference curve used by the operator for controlling the gas turbine. According to an exemplary embodiment, ttxh can be seen as a locus of points where the gas turbine operates at optimal ttx and tpr values. The four matrices are the exhaust temperature lean fuel matrix ttxl, the pressure ratio lean fuel matrix tprl, the exhaust temperature rich fuel matrix ttxr, and the pressure ratio rich fuel tprr. Elements of these matrices are listed below:
   $ttxl=[ttxl_{i,j,k}]$ for lean fuel,
   $tprl=[tprl_{i,j,k}]$ for lean fuel,
   $ttxr=[ttxr_{i,j,k}]$ for rich fuel, and
   $tprr=[tprr_{i,j,k}]$ for rich fuel.

Assuming that the actual operating conditions tamb, igv and tnh are within ranges $tamb_{i-1} \leq tamb<tamb_i$; $igv_{j-1} \leq igv<igv_j$; and $tnh_{k-1} \leq tnh<tnh_k$, the actual reference curve ttxh is given by:
   $ttxh=ttxha+\Delta ttxh$,
where ttxha defines a reference curve for the operation of the gas turbine at optimal ttx and tpr points, but also taking into account compressor inlet pressure and gas turbine exhaust pressure drop, and $\Delta ttxh$ is a correction of ttxha that is used to maintain the turbine firing temperature at optimum values while the inlet and exhaust pressure drops of the turbine vary.

Reference curve ttxha is defined as:

ttxha=ttxhr·(LHV−LHVl)/(LHVr−LHVl)+ttxhl·(LHVr−LHV)/(LHVr−LHVl), where the parameters defining ttxha are defined as follows:

ttxhr=ttxr$_{i-1}$+(ttxr$_i$−ttxr$_{i-1}$)/(tprr$_i$−tprr$_{i-1}$)·(tpr−tprr$_{i-1}$), ttxhl=ttxl$_{i-1}$+(ttxl$_i$−ttxl$_{i-1}$)/(tprl$_i$−tprl$_{i-1}$)·(tpr−tprl$_{i-1}$), LHV is the lower heating value of the actual fuel,
LHVl is the lower heating value of the lean fuel,
LHVr is the lower heating value of the rich fuel.

The following bilinear interpolations are applied:

ttxl$_{i-1}$=BilinearInterpolation(ttxl$_{i-1,j-1,k-1}$, ttxl$_{i-1,j,k-1}$, ttxl$_{i-1,j,k}$, ttxl$_{i-1,j-1,k}$, igv, tnh)=
ttxl$_{i-1,j-1,k-1}$·(igv$_j$−igv)/(igv$_j$−igv$_{j-1}$)·(tnh$_k$−tnh)/tnh$_k$−tnh$_{k-1}$)+
ttxl$_{i-1,j,k-1}$·(igv−igv$_{j-1}$)/(igv$_j$−igv$_{j-1}$)·(tnh$_k$−tnh)/tnh$_k$−tnh$_{k-1}$)+
ttxl$_{i-1,j,k}$·(igv−igv$_{j-1}$)/(igv$_j$−igv$_{j-1}$)·(tnh−tnh$_{k-1}$)/tnh$_k$−tnh$_{k-1}$)+
ttxl$_{i-1,j-1,k}$·(igv$_j$−igv)/(igv$_j$−igv$_{j-1}$)·(tnh−tnh$_{k-1}$)/tnh$_k$−tnh$_{k-1}$), ttxl$_i$=BilianearInterpolation(ttxl$_{i,j-1,k-1}$, ttxl$_{i,j,k-1}$, ttxl$_{i,j-1,k}$, igv, tnh)=
ttxl$_{i,j,k-1}$·(igv−igv$_{j-1}$)/(igv$_j$−igv$_{j-1}$)·(tnh$_k$−tnh)/tnh$_k$−tnh$_{k-1}$)+
ttxl$_{i,j,k}$·(igv−igv$_{j-1}$)/(igv$_j$−igv$_{j-1}$)·(tnh−tnh$_{k-1}$)/tnh$_k$−tnh$_{k-1}$)+
ttxl$_{i,j-1,k}$·(igv$_j$−igv)/(igv$_j$−igv$_{j-1}$)·(tnh−tnh$_{k-1}$)/tnh$_k$−tnh$_{k-1}$), tprl$_{i-1}$=BilinearInterpolation(tprl$_{i-1,j-1,k-1}$, tprl$_{i-1,j,k-1}$, tprl$_{i-1,j,k}$, tprl$_{i-1,j-1,k}$, igv, tnh)=
tprl$_{i-1,j-1,k-1}$·(igv$_j$−igv)/(igv$_j$−igv$_{j-1}$)·(tnh$_k$−tnh)/tnh$_k$−tnh$_{k-1}$)+
tprl$_{i-1,j,k-1}$·(igv−igv$_{j-1}$)/(igv$_j$−igv$_{j-1}$)·(tnh$_k$−tnh)/tnh$_k$−tnh$_{k-1}$)+
tprl$_{i-1,j,k}$·(igv−igv$_{j-1}$)/(igv$_j$−igv$_{j-1}$)·(tnh−tnh$_{k-1}$)/tnh$_k$−tnh$_{k-1}$)+
tprl$_{i-1,j-1,k}$·(igv$_j$−igv)/(igv$_j$−igv$_{j-1}$)·(tnh−tnh$_{k-1}$)/tnh$_k$−tnh$_{k-1}$), tprl$_i$=BilinearInterpolation(tprl$_{i,j-1,k-1}$, tprl$_{i,j,k-1}$, tprl$_{i,j,k}$, tprl$_{i,j-1,k}$, igv, tnh)=
tprl$_{i,j,k-1}$·(igv$_j$−igv)/igv$_j$−igv$_{j-1}$)·(tnh$_k$−tnh)/tnh$_k$−tnh$_{k-1}$)+
tprl$_{i,j,k-1}$·(igv−igv$_{j-1}$)/(igv$_j$−igv$_{j-1}$)·(tnh$_k$−tnh)/tnh$_k$−tnh$_{k-1}$)+
tprl$_{i,j,k}$·(igv−igv$_{j-1}$)/(igv$_j$−igv$_{j-1}$)·(tnh−tnh$_{k-1}$)/tnh$_k$−tnh$_{k-1}$)+
tprl$_{i,j-1,k}$·(igv$_j$−igv)/(igv$_j$−igv$_{j-1}$)·(tnh−tnh$_{k-1}$)/tnh$_k$−tnh$_{k-1}$), ttxr$_i$=BilinearInterpolation(ttxr$_{i,j-1,k-1}$, ttxr$_{i,j,k-1}$, ttxr$_{i,j,k}$, ttxr$_{i,j-1,k}$, igv, tnh)=
ttxr$_{i-1,j-1,k-1}$·(igv$_j$−igv)/igv$_j$−igv$_{j-1}$)·(tnh$_k$−tnh)/(tnh$_k$−tnh$_{k-1}$)+
ttxr$_{i-1,j,k-1}$·(igv−igv$_{j-1}$)/igv$_j$−igv$_{j-1}$)·(tnh$_k$−tnh)/(tnh$_k$−tnh$_{k-1}$)+
ttxr$_{i-1,j,k}$·(igv−igv$_{j-1}$)/igv$_j$−igv$_{j-1}$)·(tnh−tnh$_{k-1}$)/(tnh$_k$−tnh$_{k-1}$)+
ttxr$_{i-1,j-1,k}$·(igv$_j$−igv)/(igv$_j$−igv$_{j-1}$)·(tnh−tnh$_{k-1}$)/tnh$_k$−tnh$_{k-1}$), ttxr$_i$=BilinearInterpolation(ttxr$_{i,j-1,k-1}$, ttxr$_{i,j,k-1}$, ttxr$_{i,j,k}$, ttxr$_{i,j-1,k}$, igv, tnh=
ttxr$_{i,j-1,k-1}$·(igv$_j$−igv)/(igv$_j$−igv$_{j-1}$)·(tnh$_k$−tnh)/tnh$_k$−tnh$_{k-1}$)+
ttxr$_{i,j,k-1}$·(igv−igv$_{j-1}$)/(igv$_j$−igv$_{j-1}$)·(tnh$_k$−tnh)/tnh$_k$−tnh$_{k-1}$)+
ttxr$_{i,j,k}$·(igv−igv$_{j-1}$)/(igv$_j$−igv$_{j-1}$)·(tnh−tnh$_{k-1}$)/tnh$_k$−tnh$_{k-1}$)+
ttxr$_{i,j-1,k}$·(igv$_j$−igv)/(igv$_j$−igv$_{j-1}$)·(tnh−tnh$_{k-1}$)/tnh$_k$−tnh$_{k-1}$), tprr$_{i-1}$=BilinearInterpolation(tprr$_{i-1,j-1,k-1}$, tprr$_{i-1,j,k-1}$, tprr$_{i-1,j,k}$, tprr$_{i-1,j-1,k}$, igv, tnh)=
tprr$_{i-1,j-1,k-1}$·(igv−igv)/(igv$_j$−igv$_{j-1}$)·(tnh$_k$−tnh)/tnh$_k$−tnh$_{k-1}$)+
tprr$_{i-1,j,k-1}$·(igv−igv$_{j-1}$)/(igv$_j$−igv$_{j-1}$)·(tnh$_k$−tnh)/tnh$_k$−tnh$_{k-1}$)+
tprr$_{i-1,j,k}$·(igv−igv$_{j-1}$)/(igv$_j$−igv$_{j-1}$)·(tnh−tnh$_{k-1}$)/(tnh$_k$−tnh$_{k-1}$)+
tprr$_{i-1,j-1,k}$·(igv$_j$−igv)/(igv$_j$−igv$_{j-1}$)·(tnh−tnh$_{k-1}$)/tnh$_k$−tnh$_{k-1}$), tprr$_i$=BilinearInterpolation(tprr$_{i,j-1,k-1}$, tprr$_{i,j,k-1}$, tprr$_{i,j,k}$, tprr$_{i,j-1,k}$, igv, tnh)=
tprr$_{i,j-1,k-1}$·(igv$_j$−igv)/(igv$_j$−igv$_{j-1}$)·(tnh$_k$−tnh)/tnh$_k$−tnh$_{k-1}$)+
tprr$_{i,j,k-1}$·(igv−igv$_{j-1}$)/(igv$_j$−igv$_{j-1}$)·(tnh$_k$−tnh)/tnh$_k$−tnh$_{k-1}$)+
tprr$_{i,j,k}$·(igv−igv$_{j-1}$)/(igv$_j$−igv$_{j-1}$)·(tnh−tnh$_{k-1}$)/tnh$_k$−tnh$_{k-1}$)+
tprr$_{i,j-1,k}$·(igv$_j$−igv)/igv$_j$−igv$_{j-1}$)·(tnh−tnh$_{k-1}$)/tnh$_k$−tnh$_{k-1}$), The correction $\Delta ttxh$ is given by:

$\Delta ttxh = ttxh \cdot ((pamb_{actual} + \Delta p_{exhaust\,ref})/(pamb_{actual} + \Delta p_{exhaust}))^{(\gamma/(1-\gamma))-1} + ((pamb_{actual} - \Delta p_{inlet\,ref})/(pamb_{actual} - \Delta p_{inlet}))^{(\gamma/(1-\gamma))-1})$, where $\gamma = a \cdot tpr + b$ with a and b being constants and $\gamma$ is made to fit the gas turbine polytropic expansion ($p \cdot t^{((1-\gamma)/\gamma)} = $ constant).

The correction $\Delta ttxh$ takes into account, among other things, the actual gas turbine exhaust and inlet pressure drops. As the gas turbine temperature control curves (ttxh for example) depend on a reference exhaust pressure drop $\Delta p_{exhaust\,ref}$ and reference inlet pressure drop $\Delta p_{inlet\,ref}$, it is possible to correct these curves for different exhaust and inlet pressure drops by using, for example, function $\Delta ttxh$.

The actual inlet pressure drop value $\Delta p_{inlet\,act}$ may be measured instead of being estimated due to the amount of dirt at the input of the compressor. In other words, the compressor inlet system pressure drop depends on the flow conditions and on the dirt in the inlet filter, the periodic dirt deposition and removal may cause an unpredictable variability of the inlet pressure drop over time. In an application, if the LHV signal is not available, for example due to calorimeter fault or calibration problems, the controller 70 may be configured to use a $LHV_{default}$ to override the actual LHV.

The above bilinear interpolations, linear interpolation and polytropic expansion, when applied as indicated above to the parameters of the gas turbine, for example, IGV angles and shaft rotational speed at various points j, and k of the allowed ranges, generate the $ttx_{set\,point}$ on the reference curve ttxh. In one exemplary embodiment, multiple $ttx_{set\,point}$ are calculated for the gas turbine for various conditions and all these points $ttx_{set\,point}$ are part of the ttxh curve. Other reference curves may be determined from ttxh, as discussed next. These additional reference curves may also be used to control the operation of the gas turbine.

According to an exemplary embodiment, a reference exhaust temperature versus compressor pressure ratio curve TTRX may be used to control the gas turbine. The TTRX curve may be defined as TTRX=Min(Isotherm$_{NO}$, ttxh), where Isotherm$_{NO}$ is defined as an isotherm of the gas turbine at normal operating conditions. In one application, the Isotherm$_{No}$ represents the maximum temperature to which the rotor of the turbine may be exposed. A control curve for the exhaust temperature versus IGV may be defined as TTRXGV=TTRX. A control curve for the exhaust temperature versus fuel may be defined as $TTRXB=TTRXB_{NO}$ if a peak load mode is off and $TTRXB=TTRXB_{PK}$ if the peak load mode is on. The peak load mode is defined as a gas turbine that runs at constant operating conditions (ambient temperature, pressure, shaft speed, IGV position, and fuel gas composition) and delivers a power higher than the nominal one. This condition occurs when the gas turbine's operating firing temperature is higher than the nominal temperature. $TTRXB_{NO}$ is given by $TTRX+Min((IGV_{max}-IGV_{set\ point})\cdot \Delta 1, \Delta 2)$, where $\Delta 2$ is a value that limits the value of the Min function, and $TTRXB_{PK}$ is given by $Min(Isotherm_{PK}, ttxh+\Delta PK)$.

According to an exemplary embodiment, the exhaust pressure drop is made up by two terms, the pressure drop due to a mass flowing in the flue of the turbine 50 and a pressure recovery due to a chimney effect. The chimney effect may appear if there is a height difference between the gas turbine exhaust and the flue discharge to the atmosphere. The first term is given by $a_a \cdot \rho_{exhaust} \cdot v^2$ and the second term is given by $(\rho_{air}-\rho_{exhaust}) \cdot \Delta h$. The meaning of each constant, parameter and variable used in the present calculations is provided later. Thus, the total exhaust pressure drop due to the flowing mass in the flue can be expressed as:

$$\Delta \rho_{exhaust} = a_a \cdot \rho_{exhaust} \cdot v^2 (\rho_{air}-\rho_{exhaust}) \cdot \Delta h \cdot g$$

where g is acceleration due to gravity which may be rewritten as:

$$a_a \cdot \rho_{exhaust} \cdot v^2 = a_a \cdot \rho_{exhaust} \cdot (W_{exhaust}/(\rho_{exhaust} \cdot a_b))^2 = a_a \cdot (W_{exhaust}/a_b)^2/\rho_{exhaust} = a/\rho_{exhaust} \cdot W_{exhaust}^2.$$

The above exhaust temperature control via IGV and exhaust temperature control via fuel curves may be used in the control of the gas turbine as follows. A gas turbine may be controlled by varying, for example, the speed of the shaft of the turbine, the angle of IGV (that directly controls the amount of air provided to the compressor), the amount of fuel provided to the combustor, the ratio of fuel/air provided to the combustor, etc. According to an exemplary embodiment, for a single shaft gas turbine, the angle of the IGV is used first to control the operation of the gas turbine, i.e., to maintain the $ttx_{act\ point}$ on the ttxh curve calculated above (in the ttx versus tpr plane). In other words, when the actual $ttx_{act\ point}$ deviates from the ttxh curve due to various conditions of the gas turbine (e.g., change in load), a first control adjusts the angle of IGV for bringing the $ttx_{act\ point}$ of the gas turbine to the $ttx_{set\ point}$. However, this control may reach a saturation point, i.e., a point at which the angle of IGV may not be modified further or it is not desired to be modified further. At this point, an amount of fuel to be provided to the gas turbine may be varied until the $ttx_{act\ point}$ is made to coincide with the $ttx_{set\ point}$. If this control becomes saturated, it is possible to change a ratio between the fluid provided by the compressor and the fuel injected into the combustor, thus limiting the fuel flow rate and further regulating $ttx_{act\ point}$.

To fully determine the ttxh curve in the ttx versus tpr plane, it is next discussed the determination of the turbine pressure ratio tpr. The gas turbine exhaust pressure is less difficult to be estimated than to be measured. Although the pressures involved in the turbine pressure ratio tpr may be measured, it is preferred to calculate tpr as discussed next because it is more accurate than the measured tpr. In this regard, it is noted that vortices may appear at locations 80 and 60 in the gas turbine, which make the measured pressures less accurate as they may vary across a small distance. The estimation may be performed based on characteristics of a flue pressure drop, exhaust gas data and ambient pressure. According to an exemplary embodiment, the turbine pressure ratio tpr is determined based on the estimated exhaust pressure drop and the absolute compressor discharge pressure. In one embodiment, the exhaust pressure drop is determined at point 60 (see FIG. 2) while the absolute compressor discharge pressure is determined at point 80 (see FIG. 2). In another embodiment, for a compressor having multiple stages, the absolute compressor discharge pressure is determined after the discharge diffuser, which is downstream of the last stage. According to this exemplary embodiment, the absolute compressor discharge pressure is measured.

According to an exemplary embodiment, the exhaust pressure drop is made up by two terms, the pressure drop due to a mass flowing in the flue of the turbine 50 and a pressure recovery due to a chimney effect. The chimney effect may appear if there is a height difference between the gas turbine exhaust and the flue discharge to the atmosphere. The first term is given by $a_a \cdot \rho_{exhaust} \cdot v^2$ and the second term is given by $(\rho_{air}-\rho_{exhaust}) \cdot \Delta h$. The meaning of each constant, parameter and variable used in the present calculations is provided later. Thus, the total exhaust pressure drop due to the flowing mass in the flue can be expressed as:

$$\Delta \rho_{exhaust} = a_a \cdot \rho_{exhaust} \cdot v^2 - (\rho_{air}-\rho_{exhaust}) \cdot \Delta h,$$

which may be rewritten as:

$$a_a \cdot \rho_{exhaust} \cdot v^2 = a_a \cdot \rho_{exhaust} \cdot (W_{exhaust}/(\rho_{exhaust} \cdot a_b))^2 = a_a \cdot (W_{exhaust}/a_b)^2/\rho_{exhaust} = a/\rho_{exhaust} \cdot W_{exhaust}^2.$$

To simplify this expression, assume that the density $\rho$ of the gas in the flue is independent of the actual exhaust pressure drop and depends only on the discharge pressure, which here is the ambient pressure, as the exhaust pressure drop is assumed to be only a small fraction of the ambient pressure. Thus, the error introduced by this simplification can be neglected. The exhaust gas density $\rho_{exhaust}$ can be expressed as:

$$\rho_{exhaust} = \rho_{exhaust\ ref} \cdot ttx_{ref}/ttx_{act} \cdot pamb_{act}/pamb_{ref}.$$

The ambient air density can be expressed as:

$$\rho_{air} = \rho_{air\ ref} \cdot tamb_{ref}/tamb_{act} \cdot pamb_{act}/pamb_{ref},$$

where:

$\rho_{exhaust}$ is the density of the exhaust gas at the $ttx_{act}$ temperature and $pamb_{act}$ ambient pressure, $\rho_{exhaust\ ref}$ is the density of the exhaust gas at the $ttx_{ref}$ temperature and $pamb_{ref}$ ambient pressure, $\rho_{air}$ is the density of the ambient air at the actual pressure and temperature, $\rho_{air\ ref}$ is the density of the ambient air at the reference pressure and temperature, $\Delta h$ is the elevation difference between the gas turbine exhaust and the flue discharge to the atmosphere, v is the exhaust speed inside the flue, $ttx_{ref}$ is the reference exhaust temperature, $ttx_{act}$ is the actual exhaust temperature, $pamb_{ref}$ is the reference ambient pressure, $pamb_{act}$ is the actual ambient pressure, $Wexhaust_{act}$ is the actual exhaust gas mass flow rate, and a is a constant typical for the specific exhaust duct.

It is assumed in this exemplary embodiment that the exhaust gas composition is substantially constant over a pre-mixed mode operation, and thus, its density is substantially constant at a given temperature.

The exhaust gas mass flow rate may be estimated as follows. Assume that the compressor air mass flow rate is independent of the compressor pressure ratio as the error introduced by this assumption is negligible for the purpose of the exhaust pressure drop estimation. The gas turbine's axial compressor air mass flow rate can be estimated by the following transfer function:

$$Wair_{act} = SG_{ha} \cdot pinlet_{act}/pinlet_{ref}(f_3 \cdot x^3 + f_2 \cdot x^2 + f_1 \cdot x + f_0) \cdot f_4 \cdot Wair_{ref} k,$$

where:

$f_0 = a_0 \cdot y^3 + b_0 \cdot y^2 + c_0 \cdot y$,
$f_1 = a_1 \cdot y^3 + b_1 \cdot y^2 + c_1 \cdot y$,
$f_2 = a_2 \cdot y^3 + b_1 \cdot y^2 + c_2 \cdot y$,
$f_3 = a_3 \cdot y^3 + b_1 \cdot y^2 + c_3 \cdot y$,
$f_4 = a_{41} \cdot z^3 + b_{41} \cdot z^2 + c_{41} \cdot x + d_{41}$ if $tnh_{act}/tnh_{ref} < tnh_{threshold}$,
$a_{42} \cdot z^3 + b_{42} \cdot z^2 + c_{42} + d_{42}$ if $tnh_{act}/tnh_{ref} \geq tnh_{threshold}$,
$x = igv_{act}/igv_{ref}$,
$y = tnh_{act}/tnh_{ref} \cdot (tinlet_{ref}/tinlet_{act})^{0.5}$,
$z = tnh_{act}/tnh_{ref} \cdot (tinlet_{ref}/tinlet_{act})$, and
$a_i$ and $a_{ij}$ are application-specific constants.

Because the gas turbine is equipped with an IBH system, at some partial load operating conditions, a fraction of the compressor's air mass flow rate is recirculated and does not enter the exhaust duct. Moreover, the fuel gas mass flow rate enters entirely through the exhaust duct. Therefore, $Wexhaust_{act} = Wair_{act} \cdot (1-IBH_{fraction}) + Wfuel_{act}$. In this exemplary embodiment, it has been assumed that the air to the bearings compensates the air from the cooling blowers.

Considering that while the gas turbine is on exhaust temperature control and the fuel/air mass ratio is substantially constant for a specific fuel gas composition, the fuel/air mass flow ratio may be evaluated as follows:

$fa_{ratio} = Wfuel_{act}/Wair_{act} = Wfuel_{ref}/Wair_{ref} \cdot LHV_{ref}/LHV_{act} = fa_{ratio\ ref} \cdot LHV_{ref}/LHV_{act}$.

The $IBH_{fraction}$ is a set point generated by the control panel and controlled while the system is not at fault. Then, the exhaust mass flow rate may be evaluated as:

$Wexhaust_{act} = Wair_{act} \cdot (1-IBH_{fraction}) \cdot (1+fa_{ratio\ ref} \cdot LHV_{ref}/LHV_{act})$.

The specific gravity of humid air $SG_{ha}$ can be evaluated based on the specific humidity as follows:

$SG_{ha} = \rho_{ha}/\rho_{da}$,
$m_{ha} = m_{da} + m_{wv}$,
$m_{da} = m_{ha} \cdot (1-sh)$,
$m_{wv} = m_{ha} \cdot sh$, and
$v_{ha} = m_{ha}/\rho_{ha} = m_{da}/\rho_{da} + m_{wv}/\rho_{wv}$.

Multiplying this last expression by $\rho_{ha}$, the following equation is obtained:

$m_{ha} = m_{da} \cdot \rho_{ha}/\rho_{da} + m_{wv} \cdot \rho_{ha}/\rho_{wv}$, where
$\rho_{ha}/\rho_{da} = SG_{ha}$ and $\rho_{ha}/\rho_{wv} = \rho_{ha} \cdot \rho_{da}/\rho_{da} \cdot \rho_{wv} = SG_{ha}/SG_{wv}$.

Thus, $m_{ha} = m_{da} \cdot \rho_{ha}/\rho_{da} + m_{wv} \cdot \rho_{ha}/\rho_{wv} = m_{da} \cdot SG_{ha} + m_{wv} \cdot SG_{ha}/SG_{wv}$, or
$m_{ha} = (1-sh) \cdot m_{ha} \cdot SG_{ha} + sh + m_{ha} \cdot SG_{ha}/SG_{wv}$.

Dividing this last expression by $m_{ha}$:

$1 = (1-sh) \cdot SG_{ha} + sh \cdot SG_{ha}/SG_{wv}$, or
$SG_{wv} = SG_{ha} \cdot ((1-sh) \cdot SG_{wv} + sh)$.

Finally, $SG_{ha} = SG_{wv}/((1-sh) \cdot SG_{wv} + sh)$.

If the specific humidity signal is not available or the transmitter is in a fault mode, the specific humidity signal can be substituted by a curve of specific humidity versus ambient temperature generated by the interpolation of the data shown in Table 1:

TABLE 1

| shdefault Average air specific humidity vs. ambient temperature | | | | | | | |
|---|---|---|---|---|---|---|---|
| tamb | $tamb_1$ | $tamb_2$ | ... | ... | ... | $tamb_6$ | $tamb_7$ |
| $sh_i$ | $sh_1$ | $sh_2$ | ... | ... | ... | $sh_6$ | $sh_7$ |

The following notations have been used in the above calculations:

$pinlet_{act}$ is the actual air pressure at the compressor inlet,
$pinlet_{ref}$ is the reference air pressure at the compressor inlet,
tamb is the ambient temperature,
$tinlet_{act}$ is the actual air temperature at the compressor inlet, may be measured with at least two thermocouples such that the maximum reading of the thermocouples is considered to be $tinlet_{act}$ or in case that one thermocouple is faulty and/or the difference in readings is too large (for example 10 F), tamb is considered to be $tinlet_{act}$,
$tinlet_{ref}$ is the reference air temperature at the compressor inlet,
$tnh_{act}$ is the compressor actual speed,
$tnh_{ref}$ is the compressor reference speed,
$igv_{act}$ is the actual igv angle,
$igv_{ref}$ is the reference igv angle,
$Wair_{act}$ is the actual air mass flow rate at the compressor inlet,
$Wair_{ref}$ is the reference air mass flow rate at the compressor inlet,
$Wexhaust_{act}$ is the actual exhaust gas mass flow rate,
$Wfuel_{act}$ is the fuel mass flow rate,
$IBH_{fraction}$ is the fraction of air bled from the compressor discharge,
$fa_{ratio\ ref}$ is the reference fuel air mass ratio,
$LHV_{ref}$ is the reference gas fuel's LHV,
$LHV_{act}$ is the actual gas fuel's LHV,
sh is the air specific humidity,
$SG_{xx}$ is the specific gravity of xx (see subscript list below),
$\rho_{xx}$ is the density of xx (see subscript list below),
$m_{xx}$ is the mass of xx (see subscript list below),
Vxx volume of xx (see subscript list below),
ha is humid air,
wv is water vapor, and
da is dry air.

Having calculated the specific gravity, the mass flow rate through the compressor and other parameters as discussed above, it is now possible to calculate the turbine pressure ratio tpr. The algorithm for calculating tpr may be summarized as follows:

calculate $SG_{ha}$ to be $SG_{wv}/((1-sh) \cdot SG_{wv} + sh)$ if sh signal is valid and available and $sh_{default}$ if sh transmitter signal fault;

assume $x = igv_{act}/igv_{ref}$, $y = tnh_{act}/tnh_{ref} \cdot (tinlet_{ref}/tinlet_{act})^{0.5}$, and $z = tnh_{act}/tnh_{ref} \cdot (tinlet_{ref}/tinlet_{act})$;

$f_0 = a_0 \cdot y^3 + b_0 \cdot y^2 + c_0 \cdot y$,
$f_1 = a_1 \cdot y^3 + b_1 \cdot y^2 + C_1 \cdot y$,
$f_2 = a_2 \cdot y^3 + b_1 \cdot y^2 + c_2 \cdot y$,
$f_3 = a_3 \cdot y^3 + b_1 \cdot y^2 + c_3 \cdot y$,
$f_4 = a_{41} \cdot z^3 + b_{41} \cdot z^2 + c_{41} \cdot z + d_{41}$ if $tnh_{act}/tnh_{ref} < tnh_{threshold}$, and
$a_{42} \cdot z^3 + b_{42} \cdot z^2 + c_{42} \cdot z + d_{42}$ if $tnh_{act}/tnh_{ref} \geq tnh_{threshold}$;

define $Wair_{act} = SG_{ha} \cdot pinlet_{act}/pinlet_{ref} \cdot (f_3 \cdot x^3 + f_2 \cdot x^2 + f_1 \cdot x + f_0) \cdot f_4 \cdot Wair_{ref} \cdot k$, evaluate $Wexhaust_{act} = Wair_{act} \cdot (1-IBH_{fraction}) \cdot (1+fa_{ratio\ ref} \cdot LHV_{ref}/LHV_{act})$, calculate $\rho_{air} = \rho_{air\ ref} \cdot tamb_{ref}/tamb_{act} \cdot pamb_{act}/pamb_{ref}$, calculate $\rho_{exhaust} = \rho_{exhaust\ ref} \cdot ttx_{ref}/ttx_{act} \cdot pamb_{act}/pamb_{ref}$, calculate $\Delta p_{exhaust} = a_a \cdot \rho_{exhaust} \cdot v^2 - (\rho_{air} - \rho_{exhaust}) \cdot \Delta h$, and evaluate $tpr = cpd/(pamb_{act} + \Delta p_{exhaust})$, where cpd is the absolute compressor discharge pressure, which is measured in this application.

Thus, the ttxh curve 104 (see FIG. 6) is fully determined at this stage. If the temperature control curves for the gas turbine have been set up for a reference exhaust pressure drop $\Delta p_{exhaust\ ref}$ and reference inlet pressure drop $\Delta p_{inlet\ ref}$, it is possible to correct the temperature control curves for a different exhaust and inlet pressure drops, for example, the actual one, by using the correction Δttxh, as already discussed above.

One or more advantages of the temperature control logic described above are discussed now. Because the entire procedure developed above for controlling the gas turbine is matrix based, the procedure is flexible and allows for easy site tuning. The procedure may bias the controlled exhaust temperature, during normal and peak load operation, based on the actual fuel's LHV (or other fuel characteristics if differently specified). Based on this bias, it is possible to better control pollutant emission, combustion dynamics and combustor's turn down margins.

When the peak mode is enabled, the gas turbine may stay at normal firing temperature if the base load power is enough to cover the driven machine's power demand and the gas turbine may stay in over-firing if the base load power does not cover the driven machine's power demand. The peak firing value may be biased by the fuel characteristics. Based on this "smart" behavior, maintaining the peak mode always enabled, it is possible to configure the gas turbine to be more reactive in case of a variation of a modified Wobbe index (MWI) base load, and/or to undertake a larger load step up starting from any operating point (largest spinning reserve).

The MWI is given by $LHV_{gas}/(SG_{gas} \cdot T_{gas})^{0.5}$, with $LHV_{gas}$ being the lower heating value of the gas, $SG_{gas}$ the specific gravity of gas, and $T_{gas}$ the temperature of the fuel gas.

Figure 8:
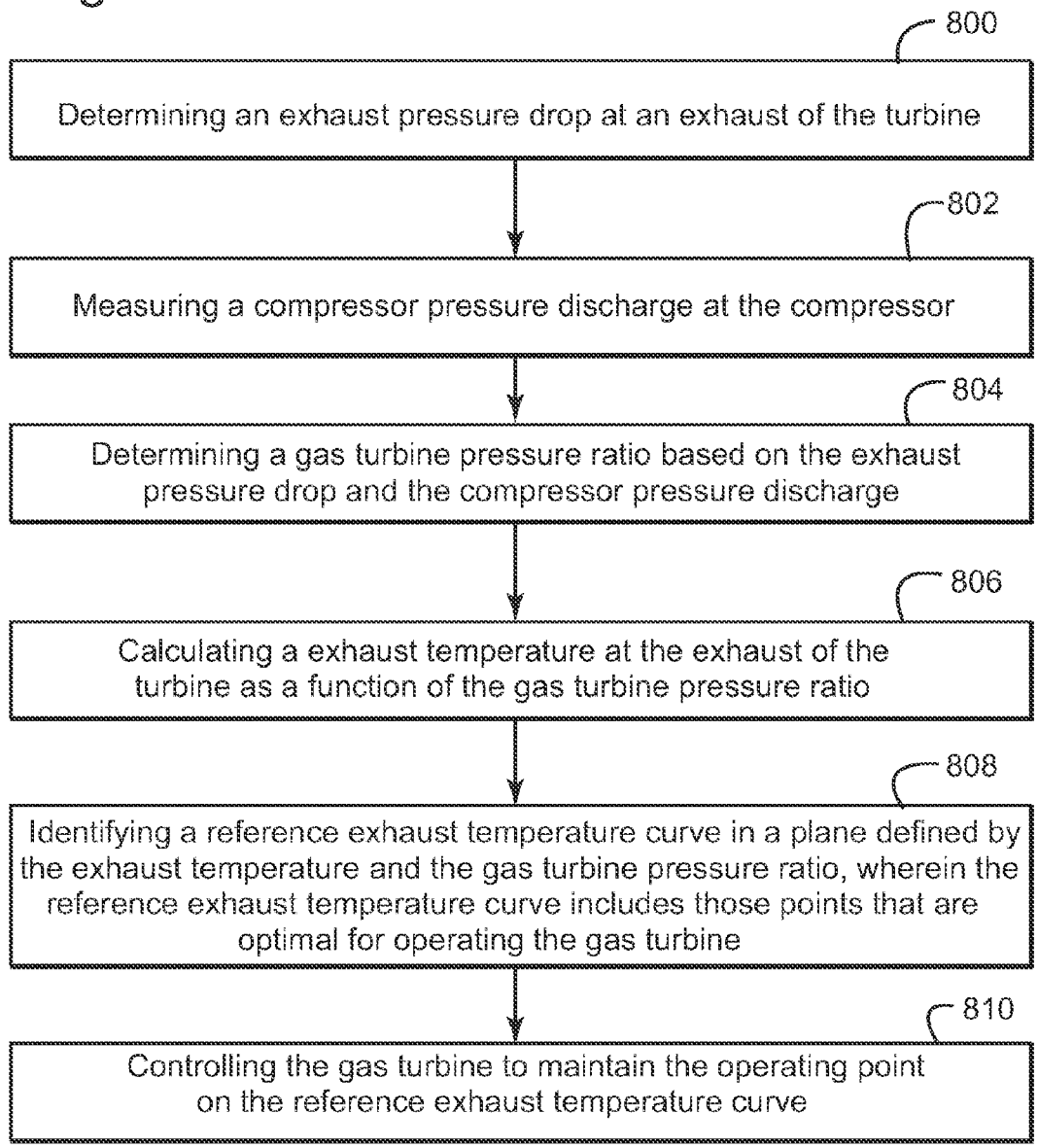
FIG. 8 is a flow chart illustrating steps for controlling the gas turbine according to an exemplary embodiment.

According to an exemplary embodiment, illustrated in FIG. 8, there is a method for controlling an operating point of a gas turbine that includes a compressor, a combustor and at least a turbine. The method includes determining a turbine exhaust pressure at an exhaust of the turbine 800, measuring a compressor pressure discharge at the compressor 802, determining a turbine pressure ratio based on the turbine exhaust pressure and the compressor pressure discharge 804, calculating an exhaust temperature at the exhaust of the turbine as a function of the turbine pressure ratio 806, identifying a reference exhaust temperature curve in a plane defined by the exhaust temperature and the turbine pressure ratio 808, where the reference exhaust temperature curve includes those points that are optimal for operating the gas turbine, and controlling the gas turbine to maintain the operating point on the reference exhaust temperature curve 810.

Alternatively, the following steps may also be performed for controlling the turbine. The gas turbine may have inlet guide vanes disposed at an inlet of the compressor and configured to adjust an amount of the fluid entering the compressor to maintain the operating point on the reference exhaust temperature curve. The processor of the gas turbine may be configured to use the reference exhaust temperature curve to control a firing temperature of the combustor, where the firing temperature is the temperature of the combustion products downstream a first stage nozzle of the turbine, or calculate a turbine exhaust pressure due to a mass flowing in the flue of the turbine, and calculate a pressure recovery due to a chimney effect, wherein the chimney effect is due to an elevation difference between the exhaust of the turbine and a flue discharge to atmosphere, and add together the turbine exhaust pressure due to the mass flowing and the pressure recovery to obtain the turbine exhaust pressure.

The turbine exhaust pressure may depends on $\rho_{exhaust}$, which is a density of the exhaust gas at an actual exhaust temperature and actual ambient pressure, $\rho_{exhaust\ ref}$ which is a density of the exhaust gas at the reference exhaust temperature and a reference ambient pressure, $\rho_{air}$, which is a density of the ambient air at the actual pressure and temperature, $\rho_{air\ ref}$, which is a density of the ambient air at the reference pressure and temperature, Δh, which is the elevation difference between the gas turbine exhaust and the flue discharge to the atmosphere, v, which is the exhaust speed inside the flue, $ttx_{ref}$, which is the reference exhaust temperature, $ttx_{act}$, which is the actual exhaust temperature, $pamb_{ref}$ which is the reference ambient pressure, $pamb_{act}$, which is the actual ambient pressure, $pinlet_{act}$, which is the actual air pressure at the compressor inlet, $pinlet_{ref}$ which is the reference air pressure at the compressor inlet, tamb, which is the ambient temperature, $tinlet_{act}$, which is the actual air temperature at the compressor inlet, $tinlet_{ref}$ which is the reference air temperature at the compressor inlet, $tnh_{act}$, which is the compressor actual speed, $tnh_{ref}$, which is the compressor reference speed, $igv_{act}$, which is the actual igv angle, $igv_{ref}$ which is the reference igv angle, $Wair_{act}$, which is the actual air mass flow rate at the compressor inlet, $Wair_{ref}$, which is the reference air mass flow rate at the compressor inlet, $Wexhaust_{act}$, which is the actual exhaust gas mass flow rate, $Wfuel_{act}$, which is the fuel mass flow rate, $IBH_{fraction}$, which is the fraction of air bled from the compressor discharge, $fa_{ratio\ ref}$ which is the reference fuel air mass ratio, $LHV_{ref}$ which is the reference gas fuel's LHV, $LHV_{act}$, which is the actual gas fuel's LHV, sh, which is the air specific humidity, ha, which is humid air, wv, which is water vapor, da, which is dry air, $SG_{xx}$, which is the specific gravity of ha, wv, or da, $\rho_{xx}$, which is the density of ha, wv, or da, $m_{xx}$, which is the mass of ha, wv, or da, and $V_{xx}$, which is a volume of ha, wv, or da.

The processor may be configured to divide the compressor pressure discharge by the turbine exhaust pressure to obtain the turbine pressure ratio or indentify plural operating points for the gas turbine in the plane defined by the exhaust temperature and the turbine pressure ratio; or apply multiple bilinear interpolations to the identified plural points; and determine a first set of points for a lean gas and a second set of points for a rich gas. Further, the processor may be configured to apply a linear interpolation to points in the first set and the second set, the points having a same turbine pressure ratio or apply a polytropic correction to a result of the linear interpolation to calculate a set point exhaust temperature.

According to an exemplary embodiment, a computer readable medium including computer executable instructions, wherein the instructions, when executed, implements a method for controlling an operating point of a gas turbine that includes a compressor, a combustor and at least a turbine.

According to an exemplary embodiment, the exhaust temperature reference curve ttxh, the exhaust temperature threshold curve ttxth and other curves represented in plane (ttx, tpr) may be calculated based on other parameters that characterize a fuel instead of the lower heating value (LHV). Such parameters may be, for example, a NOx (oxides of Nitrogen) factor, an upper to lower flammability ratio (a lower flammability limit is the smallest percentage of combustible in a given volume of a mixture of fuel and air (or other oxidant) that supports a self propagating flame and an upper flammability limit is the highest percentage of the combustible in the given volume that supports a self propagating flame), etc. In other words, the ttxh curve has been calculated in an exemplary embodiment discussed above as being ttxh=ttxha+Δttxh, where ttxha=ttxhr·(LHV−LHVl)/(LHVr−LHVl)+ttxhl· (LHVr−LHV)/(LHVr−LHVl). However, the ttxha depends on the lower heating value LHV of the fuel and not from, for example, the NOx factor, the upper to lower flammability ratio, etc.

Thus, if a gas turbine is fed sequentially with first and second fuels, which have the same MWI index but different NOx factors, the algorithm discussed above for calculating the ttxh is not sensitive to the NOx factor as this factor is not part of the ttxha function. As the MWI factor depends from the LHV, which is reflected in the formula for the ttxha, ttxha and implicitly the ttxh curve are influenced by a change in the MWI index of the fuel. However, as the first and second fuels have similar MWI indexes, the ttxh curve and other curves based on the LHV variable will not be able to "see" that different fuels are provided to the gas turbine.

For this reason, according to an exemplary embodiment, the ttxh, ttxth, and other curves may be calculated as a function of the NOx factor, the upper to lower flammability ratio, or other parameters characteristics for a fuel. In one application, the same mathematical functions and algorithm may be used to calculate the new ttxh, ttxth curves but with the LHV parameter replaced by the new parameter. However, other functions and/or algorithms may be used to calculate the ttxh, ttxth and other curves based on the NOx factor, the upper to lower flammability ratio, etc. In other words, the controller 70 may be configured to calculate the desired curves in multiple (ttx, tpr) planes, each corresponding to a given fuel parameter.

Figure 9:
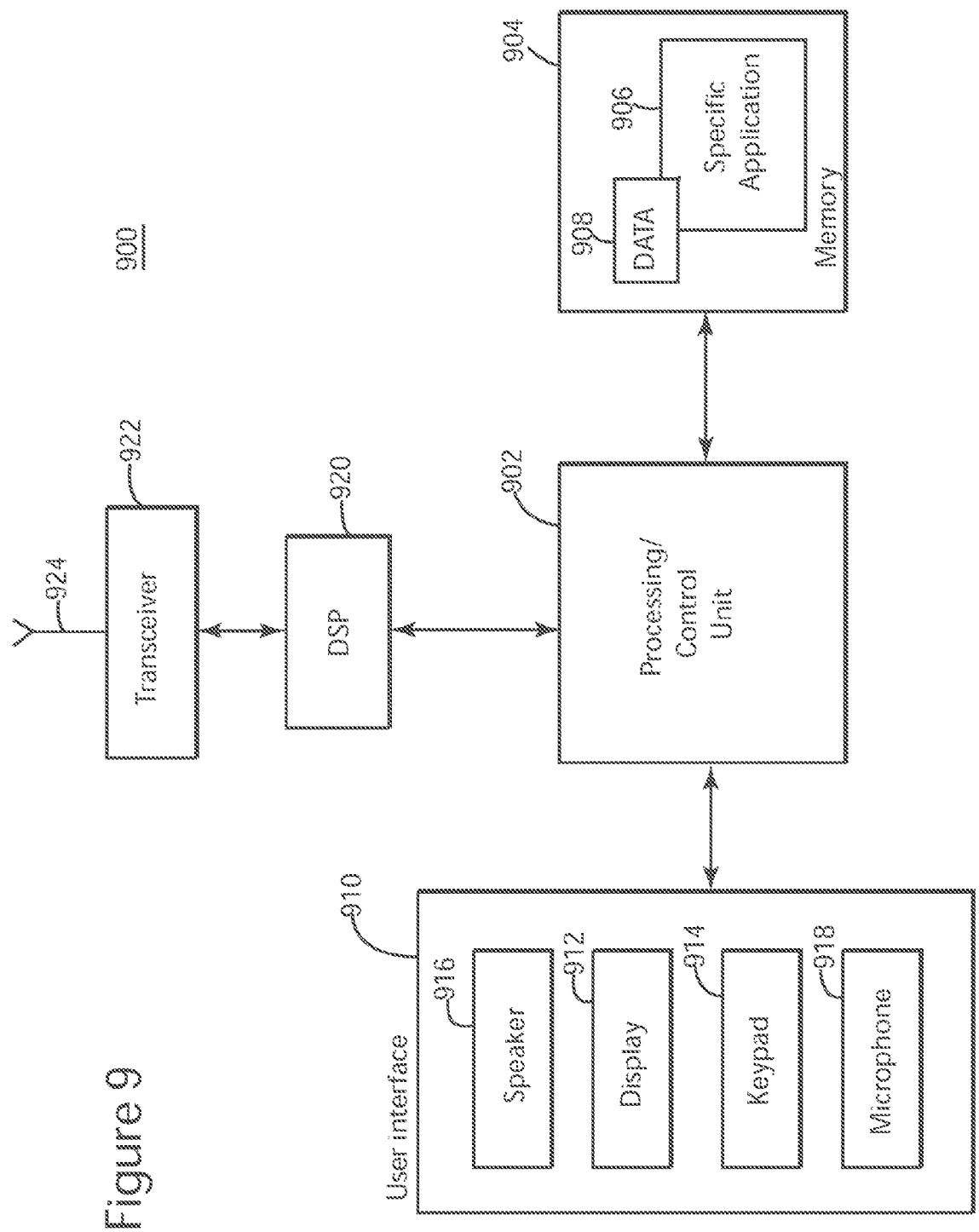
FIG. 9 is a schematic diagram of a controller used to control the gas turbine according to an exemplary embodiment.

For purposes of illustration and not of limitation, an example of a representative controller 900 capable of carrying out operations in accordance with the exemplary embodiments is illustrated in FIG. 9. The controller 70 discussed above with regard to FIG. 2 may have the structure of controller 900. It should be recognized, however, that the principles of the present exemplary embodiments are equally applicable to a processor, computer system, etc.

The exemplary controller 900 may include a processing/control unit 902, such as a microprocessor, reduced instruction set computer (RISC), or other central processing module. The processing unit 902 need not be a single device, and may include one or more processors. For example, the processing unit 902 may include a master processor and associated slave processors coupled to communicate with the master processor.

The processing unit 902 may control the basic functions of the system as dictated by programs available in the storage/memory 904. Thus, the processing unit 902 may execute the functions described in FIG. 8. More particularly, the storage/memory 904 may include an operating system and program modules for carrying out functions and applications on the controller. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the controller 900 via data signals, such as being downloaded electronically via a network, such as the Internet.

One of the programs that may be stored in the storage/memory 904 is a specific program 906. As previously described, the specific program 906 may store relevant parameters of the gas turbine and also may include instructions for calculating the $ttx_{set\,point}$ and sending instructions to close or open IGV, etc. The program 906 and associated features may be implemented in software and/or firmware operable by way of the processor 902. The program storage/memory 904 may also be used to store data 908, such as the relevant parameters of the gas turbine, or other data associated with the present exemplary embodiments. In one exemplary embodiment, the programs 906 and data 908 are stored in non-volatile electrically-erasable, programmable ROM (EEPROM), flash ROM, etc. so that the information is not lost upon power down of the parallel computing system 900.

The processor 902 may also be coupled to user interface 910 elements associated with a control station in a power plant. The user interface 910 of the power plant may include, for example, a display 912 such as a liquid crystal display, a keypad 914, speaker 916, and a microphone 918. These and other user interface components are coupled to the processor 902 as is known in the art. The keypad 914 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The controller 900 may also include a digital signal processor (DSP) 920. The DSP 920 may perform a variety of functions, including analog-to-digital (A/D) conversion, digital-to-analog (D/A) conversion, speech coding/decoding, encryption/decryption, error detection and correction, bit stream translation, filtering, etc. The transceiver 922, generally coupled to an antenna 924, may transmit and receive the radio signals associated with a wireless device.

The controller 900 of FIG. 9 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 906 and associated features, and data 908, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a gas turbine and a method for controlling the gas turbine based on a new paradigm, e.g., exhaust temperature versus turbine pressure ratio. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

As also will be appreciated by one skilled in the art, the exemplary embodiments may be embodied in a wireless communication device, a control station in a power plant, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for controlling an operating point of a gas turbine that includes a compressor, a combustor and a turbine, the method comprising:
   estimating a turbine exhaust pressure at an exhaust of the turbine by adding together an actual ambient pressure and a calculated turbine exhaust pressure change;
   measuring a compressor pressure discharge at the compressor;
   determining a turbine pressure ratio based on the turbine exhaust pressure and the compressor pressure discharge;
   calculating an exhaust temperature at the exhaust of the turbine as a function of the turbine pressure ratio;
   identifying a reference exhaust temperature curve in a plane that is defined by the exhaust temperature and the turbine pressure ratio, wherein the reference exhaust temperature curve includes chosen gas turbine operating points;
   measuring an actual turbine exhaust temperature at the exhaust of the turbine; and
   controlling the gas turbine to maintain the operating point on the reference exhaust temperature curve;
   wherein determining the calculated turbine exhaust pressure change comprises:
      calculating an exhaust pressure drop due to a mass flowing in a flue of the turbine as a function of an exhaust gas mass flow rate and an exhaust gas density;
      calculating a pressure recovery due to a chimney effect as a function of an ambient air density, the exhaust gas density and an elevation difference between the exhaust of the turbine and a flue discharge to atmosphere; and
      adding together the exhaust pressure drop due to the mass flowing and the pressure recovery to obtain the calculated turbine exhaust pressure change; and
   wherein identifying the reference exhaust temperature curve comprises:
      identifying first and second sets of rich fuel data points based on a rich fuel data matrix, a rotation angle of inlet guide vanes disposed at an inlet of the compressor, and a rotational speed of a shaft of the turbine,
      identifying first and second sets of lean fuel data points based on a lean fuel data matrix, the rotation angle, and the rotational speed;
      applying a first multivariable interpolation function to each of the first and second sets of rich fuel data points to determine a rich gas exhaust temperature control curve in the plane,
      applying a second multivariable interpolation function to each of the first and second sets of lean fuel data points to determine a lean gas exhaust temperature control curve in the plane,
      applying multiple linear interpolations between the rich gas exhaust temperature control curve and the lean gas exhaust temperature control curve to obtain the reference exhaust temperature curve.

2. The method of claim 1, further comprising: adjusting the rotation angle to maintain the operating point on the reference exhaust temperature curve.

3. The method of claim 1, further comprising:
   using the reference exhaust temperature curve to control a firing temperature of the combustor, wherein the firing temperature is the temperature of the combustion products downstream a first stage nozzle of the turbine.

4. The method of claim 1, wherein determining the turbine pressure ratio comprises dividing the compressor pressure discharge by the turbine exhaust pressure to obtain the turbine pressure ratio.

5. The method of claim 1, further comprising: applying a polytropic correction to a result of at least one of the multiple linear interpolations to calculate a set point exhaust temperature.

6. A gas turbine having a control device for controlling an operating point of the gas turbine, the gas turbine comprising:
   a compressor configured to compress a fluid into a compressed fluid;
   a combustor connected to a discharge of the compressor and configured to mix the compressed fluid with fuel;
   a turbine connected to the compressor and configured to expand burnt gas from the combustor to generate power to an output of the gas turbine;
   a pressure sensor provided at the discharge of the compressor to measure a compressor pressure discharge;
   a temperature sensor provided at the discharge of the turbine to measure a turbine exhaust temperature;
   a processor that communicates with the pressure sensor and the temperature sensor is configured to;
      estimate a turbine exhaust pressure at an exhaust of the turbine by adding together an actual ambient pressure and a calculated turbine exhaust pressure change;
      calculate an exhaust pressure drop due to a mass flowing in a flue of the turbine as a function of an exhaust gas mass flow rate and an exhaust gas density;
      calculate a pressure recovery due to a chimney effect as a function of an ambient air density, the exhaust gas density and an elevation difference between the exhaust of the turbine and a flue discharge to atmosphere;
      add together the exhaust pressure drop and the pressure recovery to obtain the calculated turbine exhaust pressure change;
      determine a turbine pressure ratio based on the turbine exhaust pressure and the compressor pressure discharge;
      calculate an exhaust temperature at the exhaust of the turbine as a function of the turbine pressure ratio;
      identify first and second sets of rich fuel data points based on a rich fuel data matrix, a rotation angle of inlet guide vanes disposed at an inlet of the compressor, and a rotational speed of a shaft of the turbine;

identify first and second sets of lean fuel data points based on a lean fuel data matrix, the rotation angle, and the rotational speed;

apply a first multivariable interpolation function to each of the first and second sets of rich fuel data points to determine a rich gas exhaust temperature control curve in a plane that is defined by the exhaust temperature and the turbine pressure ratio, apply a second multivariable interpolation function to each of the first and second sets of lean fuel data points to determine a lean gas exhaust temperature control curve in the plane, apply multiple linear interpolations between the rich gas exhaust temperature control curve and the lean gas exhaust temperature control curve to identify a reference exhaust temperature curve in the plane, wherein the reference exhaust temperature curve includes chosen gas turbine operating points; and control the gas turbine to maintain the operating point on the reference exhaust temperature curve.

7. The gas turbine of claim 6, wherein the control device is configured to adjust the rotation angle to maintain the operating point on the reference exhaust temperature curve.

8. The gas turbine of claim 6, wherein the processor is configured to use the reference exhaust temperature curve to control a firing temperature of the combustor, wherein the firing temperature is the temperature of the combustion products downstream a first stage nozzle of the turbine.

9. The gas turbine of claim 6, wherein the processor is configured to determine the turbine pressure ratio by dividing the compressor pressure discharge by the turbine exhaust pressure to obtain the turbine pressure ratio.

10. The gas turbine of claim 6, wherein the processor is configured to apply a polytropic correction to a result of at least one of the multiple linear interpolations to calculate a set point exhaust temperature.

* * * * *